Aug. 22, 1967  F. C. RIZZATO  3,337,240
BICYCLE WITH SINGLE BEAM FRAME
Filed June 1, 1965

INVENTOR
FRANCESCO CESARE RIZZATO

BY Richards + Geier

ATTORNEY

United States Patent Office 3,337,240
Patented Aug. 22, 1967

3,337,240
BICYCLE WITH SINGLE BEAM FRAME
Francesco Cesare Rizzato, Via Verolin 4,
Padova, Italy
Filed June 1, 1965, Ser. No. 460,035
Claims priority, application Italy, Nov. 23, 1964,
743,667/64
7 Claims. (Cl. 280—278)

The present invention has for its object a completely novel bicycle frame inasmuch as it is essentially constituted by a singular tubular beam forming schematically three sides of a parallelogram, the central side whereof is the bottom horizontal one.

The realization of the rear wheel mounting is obtained by doubling the single beam in two divaricated elements, near the central drive and reuniting newly in one near the saddle carrying end.

The front fork in its two tubular elements reproduces the shape of said single beam, inasmuch as a first horizontal section is followed by a descending section, parallel to the two posts of the main frame.

With these design features of a basic structural character it combines also the following other constructive details that make it substantially different from other bicycle types.

Indeed, the saddle carrier is pivoted at the end of the rear standard of the single beam frame, so that the saddle can perform rotational excursions about said pivot to adjust its height. Further the driving handle bar is formed by two elements, inserted telescoping in a support each so that the two separate arms, ending in the hand grips, can be caused to rotate forwardly or to be brought down, so as to adjust also the handle bar height.

In addition, the two supports are pivoted on the front fork, so as to enable the unit to swing forwardly (what is practically useful in the case of a foldable bicycle embodiment), by the insertion of a suitable hinge in the horizontal section of the single beam frame, ahead of the central drive.

All these particularities are further combined with the special ridge-shaped execution of the two mudguards, so that the bicycle represents certainly something totally new, from the constructive point of view, in all its details.

The figures in the attached drawing illustrate the practical realization of the invention, and namely:

In all these figures, suitable arrows show the movement possibilities of the different movable parts.

With reference to the above mentioned figures, the single beam frame 1 is constituted by the front post 2, by the rear post 3, which both are parallel to each other and raking forwardly, at an angle of about 60° with the horizontal line and by a horizontal section 4 joining them at the bottom.

Figure 3:
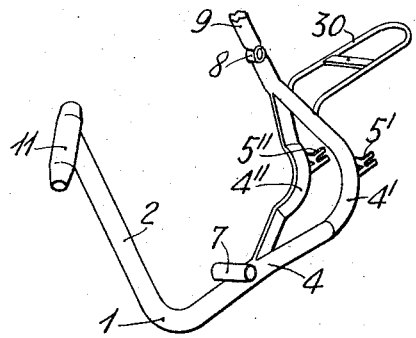
FIGURE 3 represents, also in perspective view, the single beam frame with the rear doubling apt to constitute the rear wheel mounting.

The rear portion of the horizontal section 4 opens out in two fork-like branches 4'–4" (FIG. 3), so as to constitute the rear wheel mounting, on which are secured the means carrying the rear wheel 6.

The central drive is applied on a transversal bushing 7, welded to the horizontal section of the tubular beam, ahead of the forked section.

On top of the rear post 3 a pivot 8 is provided for the saddle carrier 9, at the end whereof there is mounted the saddle 10.

Figure 4:
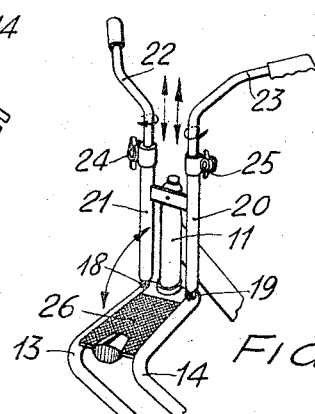
FIGURE 4 shows the detail of the handle bar lay-out, also in a perspective view.

In front, at the upper end of the standard 2, there is applied the steering bushing 11 guiding the fork spindle 12, where terminate the two tubular elements 13–14, actually constituting the front fork, at the end whereof is mounted the wheel 15. The shaping of the front fork reproduces the rake of about 60° relative to the horizontal line. The two horizontal sections of the front fork have transversal bridging elements 16–17, constituting the abutting plane for a baggage rack 26 (FIG. 4), and also two pivoting supports 18–19 on which are pivoted the two carriers 20–21 for the two elements 22–23, constituting the handle bar.

Suitable clamping devices 24–25 allow to fix the handle bar elements at the desired height.

The mudguard 27, for the front wheel, as mentioned above, is of the ridge type, however, with a straight line profile. Similarly straight line profiled and ridgeshaped is the front part of the rear mudguard 28, joining at its rear with the portion 29, that follows the contour of the rear wheel 6.

To the rear end fork there is further welded the support 30 for the rear end baggage rack.

In the hatched point 31 of the horizontal section of the tubular beam 1–4 there is arranged in the construction of the foldable type bicycle, a hinge not represented.

As already mentioned, the saddle 10 can be brought from its lowermost position 10' to its uppermost position 10" by a rotation that also serves to move it away, besides lifting it, so as to fit the bicycle to the cyclist stature.

Also the two handle bar elements 23 can be moved from their lowered position 23' to that of maximum elevation or spacing 23", so that they too may be fitted to the cyclist stature.

Figure 1:
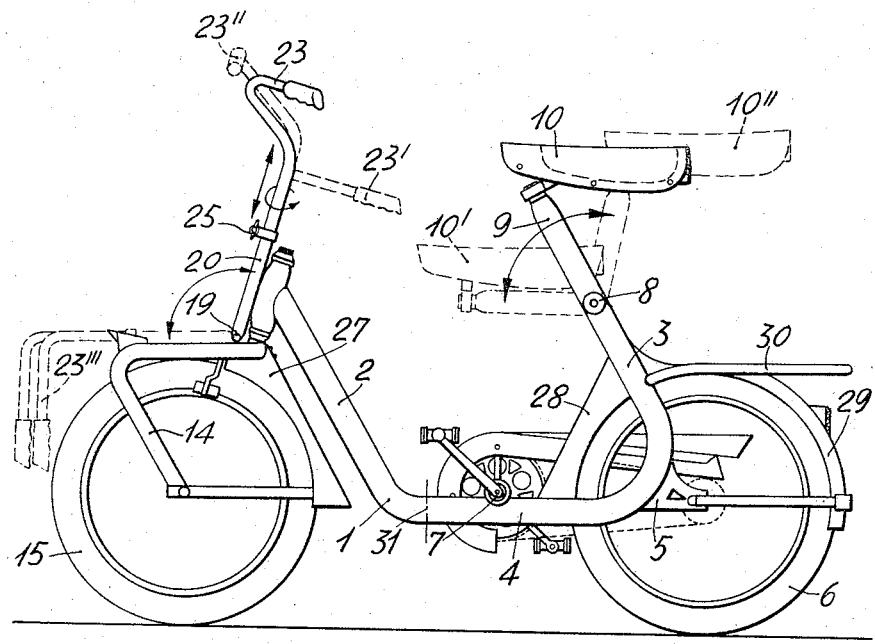
FIGURE 1 shows a side view of the complete bicycle, wherein there are shown in dotted lines the positions that both the saddle and the handle bar, as well as the driving handle bar can take up.
Figure 2:
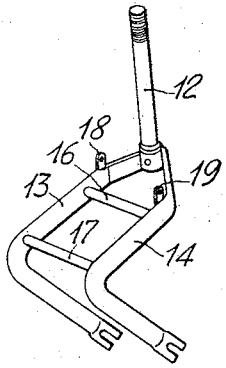
FIGURE 2 shows in a reduced scale a perspective side view of the front fork.

The handle bar may even perform the complete rotation forward so as to assume the position 23'" (FIGURE 1) as shown in the attached drawing.

It is obvious that the tubular structure just described can have any cross-section, from a circular one to a more or less flattened or elongated elliptical one. Further, the dimensions as well as the nature of the materials used for realizing it constitute no restriction for the invention.

What is claimed is:
1. A bicycle, comprising a frame having a lower horizontal section, a front post connected to one end of said horizontal section, a rear post connected to the other end of said horizontal section, said two posts extending forwardly and parallel to each other, a central drive carried by said horizontal section, a steering spindle, a steering bushing connecting said steering spindle to said front post, a front fork having two tubular prongs, each of said tubular prongs having a rear end connected with said spindle, said tubular prongs further having two parallel forwardly extending substantially horizontal portions and two parallel rearwardly extending portions constituting a continuation of said forwardly extending portions and extending substantially parallel to said posts, bridging elements interconnecting said horizontal portions, a front baggage rack carried by said bridging elements, pivots carried by said horizontal portions, two supports carried by said pivots, and elements constituting handlebars carried by said supports, whereby said handlebars can perform rotational movements ranging from the steering bushing to the front baggage rack.

2. A bicycle according to claim 1, characterized by it that the two elements constituting the handle bar are telescoping inside their respective supports, and can move each upwards and downwards, as well as carry out rotational movements, and clamping means for locking the handlebars in the wanted position on their supports.

3. A bicycle in accordance with claim 1, wherein said parallel front and rear posts extend at an angle of substantially 60 degrees.

4. A bicycle in accordance with claim 1, wherein the lower horizontal section of the frame comprises a hinge.

5. A bicycle comprising front and rear wheels, a single tubular frame having a front post, a rear post, said posts extending forwardly and parallel to each other and a horizontal section interconnecting said posts, a portion of said frame constituting the connection between said horizontal section and said rear post consisting of two semi-circular symmetrical branches receiving said rear wheel, a saddle-carrying beam, a locking pivot connecting the bottom end of said beam with the top end of said rear post, a front spindle, means connecting said front spindle to said front post, a front fork connected with the lower end of said front spindle and carrying said front wheel, two half handlebars, and means adjustably supporting said half handlebars upon said front fork.

6. A bicycle in accordance with claim 5, wherein said front fork has two tubular prongs, each of said prongs having two parallel forwardly extending substantially horizontal portions and two parallel rearwardly extending portions constituting a continuation of said forwardly extending portions and extending substantially parallel to said posts, the means connecting the front spindle to the front post consisting of a steering bushing connected to the front post and guiding the front spindle, the means supporting the half handlebars upon the front fork consisting of two pivoting supports mounted upon separate horizontal portions of the prongs, tubular supports carried by said pivoting supports, said half handlebars having stems extending into said tubular supports, and clamping devices carried by said tubular supports for adjustably clamping said stems therein, said horizontal portions being adapted to serve as a baggage carrier.

7. A bicycle in accordance with claim 5, wherein said locking pivot has a transverse horizontal axis, said bicycle further having a saddle and a pivot having an axis extending in the direction of the bicycle and connecting said saddle with the saddle-carrying beam.

References Cited

UNITED STATES PATENTS 2,705,156   3/1955   Torre _____ 280—287

FOREIGN PATENTS 1,106,754   12/1955   France.
1,380,625   10/1964   France.
  467,825   12/1951   Italy.
  531,448   8/1955   Italy.
   72,350   5/1953   Netherlands.

KENNETH H. BETTS, *Primary Examiner.*